(12) United States Patent
McNally

(10) Patent No.: US 10,000,131 B2
(45) Date of Patent: *Jun. 19, 2018

(54) SYSTEMS FOR DETERMINING RELATIVE POSITION AND ORIENTATION OF A VEHICLE WITH RESPECT TO A CHARGING STATION

(71) Applicant: Jaguar Land Rover Limited, Coventry, Warwickshire (GB)

(72) Inventor: Mark McNally, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/637,040

(22) Filed: Jun. 29, 2017

(65) Prior Publication Data

US 2017/0297441 A1    Oct. 19, 2017

Related U.S. Application Data

(63) Continuation of application No. 14/759,978, filed as application No. PCT/EP2013/074933 on Nov. 28, 2013, now Pat. No. 9,862,280.

(30) Foreign Application Priority Data

Jan. 10, 2013  (GB) .................................. 1300402.3

(51) Int. Cl.
| | | |
|---|---|---|
| *H01M 10/46* | (2006.01) | |
| *B60L 11/18* | (2006.01) | |
| *B62D 15/02* | (2006.01) | |

(52) U.S. Cl.
CPC ....... *B60L 11/1816* (2013.01); *B60L 11/1824* (2013.01); *B60L 11/1825* (2013.01);
(Continued)

(58) Field of Classification Search
CPC ........ H02J 7/355; H02J 7/0042; H02J 7/0027; H02J 7/0021; H02J 7/0026
(Continued)

(56) References Cited

U.S. PATENT DOCUMENTS 5,720,627 A * 2/1998 Gillbrand ............... H01R 13/72
                                                    191/12 R
6,157,162 A    12/2000 Hayashi et al.
(Continued)

FOREIGN PATENT DOCUMENTS

| JP | 2004-291865 A | 10/2004 |
|---|---|---|
| JP | 2012-039743 A | 2/2012 |

(Continued)

OTHER PUBLICATIONS

Machine translation of JP 2012-039743 (Feb. 23, 2012).*
(Continued)

*Primary Examiner* — Edward Tso
(74) *Attorney, Agent, or Firm* — Myers Bigel, P.A.

(57) ABSTRACT

A guidance system for a motor vehicle comprising: a controller, the controller being operable to determine whether a first length of cable is sufficiently long to allow a charging connection to be established between a motor vehicle and a charging station in dependence on data corresponding to a relative position and orientation of the vehicle with respect to the charging station; and output means for providing an output to a user indicating whether the cable is sufficiently long.

15 Claims, 5 Drawing Sheets

(52) U.S. Cl.
CPC ....... *B60L 11/1827* (2013.01); *B60L 11/1833* (2013.01); *B60L 11/1835* (2013.01); *B60L 11/1838* (2013.01); *B62D 15/028* (2013.01); *B60L 2230/12* (2013.01); *B60L 2250/16* (2013.01); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01); *Y02T 90/16* (2013.01)

(58) Field of Classification Search
USPC .................. 320/104, 105, 107, 109, 111
See application file for complete search history.

(56) References Cited

U.S. PATENT DOCUMENTS

| | | | |
|---|---|---|---|
| 8,058,841 B2* | 11/2011 | Chander | ............. B60L 11/1816 320/115 |
| 2004/0267420 A1 | 12/2004 | Tanaka et al. | |
| 2010/0102775 A1 | 4/2010 | Chander et al. | |
| 2010/0235006 A1 | 9/2010 | Brown | |
| 2011/0139521 A1 | 6/2011 | Ichikawa | |
| 2011/0181241 A1* | 7/2011 | Badger | ............... B60L 11/1818 320/109 |
| 2012/0091959 A1 | 4/2012 | Martin et al. | |
| 2012/0095617 A1 | 4/2012 | Martin | |
| 2017/0267114 A1* | 9/2017 | Bianco | ..................... B60L 3/04 |

FOREIGN PATENT DOCUMENTS

| | | |
|---|---|---|
| JP | 2012-095494 A | 5/2012 |
| JP | 2013-173114 | 9/2013 |

OTHER PUBLICATIONS

Notice of Reasons for Refusal, Japanese Patent Application No. 2015-552008, dated Jul. 5, 2016; 10 pages.
Notice of Preliminary Rejection, Korean Patent Application No. 10-2015-7020200, dated Nov. 10, 2016, 7 pages.
Notification of the Second Office Action, Chinese Application No. 201380070110.9, dated Jan. 17, 2017.
Notice of Preliminary Rejection with English language translation, KR Application No. 10-2017-7024863, dated Dec. 11, 2017, 7 pp.

* cited by examiner

SYSTEMS FOR DETERMINING RELATIVE POSITION AND ORIENTATION OF A VEHICLE WITH RESPECT TO A CHARGING STATION

RELATED APPLICATIONS

This application is a continuation of U.S. application Ser. No. 14/759,978, filed Jul. 9, 2015, which is a 35 U.S.C. § 371 national stage application of PCT Application No. PCT/EP2013/074933, filed on Nov. 28, 2013, which claims priority from Great Britain Patent Application No. 1300402.3, filed on Jan. 10, 2013, the contents of which are incorporated herein by reference in their entireties. The above-referenced PCT International Application was published in the English language as International Publication No. WO 2014/108247 A2 on Jul. 17, 2014.

TECHNICAL FIELD

The present invention relates to a guidance system and method and particularly, but not exclusively, to a guidance system and method for plug-in electric or hybrid electric vehicles. Aspects of the invention relate to a system, to a vehicle and to a method.

BACKGROUND

It is known to provide a plug-in electric or hybrid electric vehicle that is connectable to an electric charging station by means of a cable in order to accomplish a battery recharging operation. The cable may be a discrete item connectable to the charging station at one end and the vehicle at the other end. A user is required to connect one end to a power outlet of the charging station and the other into the power inlet of the vehicle. In some alternative designs, the charge cable may be arranged to be permanently connected to the vehicle and carried thereby, or permanently connected to the charging station. The cable may be stored retractably on a drum or the like.

When using charging stations at different locations, a user may experience difficulty positioning the vehicle at a suitable location and at a suitable orientation to ensure that a charging connection can be made with the available cable length. Once parked, a user may find that they are unable to establish a charging connection due to the length of the cable being insufficient to establish a suitable charging connection. The user may therefore be inconvenienced by the requirement to reposition the vehicle.

It is desirable to improve an ease with which a user may undertake a recharging operation.

SUMMARY OF THE INVENTION

Embodiments of the invention may be understood with reference to the appended claims.

Aspects of the present invention provide a system, a vehicle and a method.

In one aspect of the invention for which protection is sought there is provided a system for a motor vehicle comprising:

A controller, the controller being operable to receive data corresponding to a relative position and orientation of the vehicle with respect to a vehicle charging station and to determine whether a first length of cable is sufficiently long to allow a charging connection to be established between the vehicle and charging station in dependence on the received data; and
output means for providing an output to a user indicating whether the first length of cable is sufficiently long.

It is to be understood that the data corresponding to the relative position and orientation of the vehicle with respect to the charging station may be data from which the controller is able to determine the relative position and orientation of the vehicle with respect to the charging station. Alternatively the data may be data providing for example a bearing of the vehicle from the charging station and a distance of the vehicle from the charging station. The orientation of the vehicle may correspond to the angle between a longitudinal axis of the vehicle and an imaginary line from the vehicle to the charging station, this angle being determined from the bearing of the vehicle from the charging station. Other arrangements are also useful.

Embodiments of the invention have the advantage that a user can be confident that their vehicle is sufficiently close to the charging station to enable a charging connection to be established before they step out of the vehicle and attempt to connect the vehicle to the charging station. This avoids the problem that the user is inconvenienced by discovering that the vehicle is not close enough after parking the vehicle and trying to connect the vehicle to the charging station.

It is to be understood that some plug-in vehicles with electric drive capability such as hybrid electric vehicles (HEVs) or electric vehicles (EVs) are sufficiently large that the vehicle must be parked within a relatively small area, depending on its orientation, in order to enable a charging connection to be established. Embodiments of the present invention greatly reduce the risk that the user is inconvenienced by not parking the vehicle sufficiently close to the charging point.

The controller may be operable to determine a length of a cable route allowing a charging connection to be established that includes one or more predetermined route portions.

The controller may be operable to determine a length of a cable route allowing a charging connection to be established that excludes one or more predetermined route portions.

This feature has the advantage that the system may be prevented from indicating the vehicle is sufficiently close when the cable must follow an unworkable or undesirable portion of a route between the vehicle and charging station. For example, it may be undesirable for the cable to pass over a portion of the vehicle body due to a risk that bodywork is damaged. Furthermore, it may be undesirable for the cable to pass across a width of the vehicle at a location between front and rear axles due to difficulty in passing the cable under the vehicle.

For the avoidance of doubt, reference to front or rear axles is intended to include reference to corresponding pairs of left and right wheels at a front or rear of the vehicle regardless of whether an axle physically connects the wheels to one another.

The controller may be operable to determine the length of cable route such that the route is external to a predetermined peripheral boundary of the vehicle.

The peripheral boundary may encircle an area corresponding to a footprint of the vehicle. Thus the cable route may be arranged not to pass underneath a portion of the vehicle, but rather remain outside a footprint of the vehicle.

Optionally the controller is configured such that the predetermined peripheral boundary encircles a wheelbase of the vehicle, optionally a footprint of the vehicle.

In other words, the system may be configured such that the cable route does not pass across a width of the vehicle between axles of the vehicle. If the cable is required to pass across the vehicle width, for the purposes of the determination made by the guidance system it may be assumed to do so either at a position forward of forward-most wheels or rearward of rear-most wheels of the vehicle (in the case the peripheral boundary encircles the wheelbase and not the footprint) or at a location forward of a forwardmost portion of the vehicle or rearward of a rearmost portion of the vehicle (in the case the peripheral boundary encircles the vehicle footprint).

In embodiments in which the peripheral boundary encircles the wheelbase, the cable may therefore pass under a portion of the vehicle overhanging front or rear wheels at the front or rear of the vehicle. This feature has the advantage that the cable 130 may present less of a trip hazard to persons walking near the vehicle 120.

The controller may be operable to determine a shortest cable route between the vehicle and charging station.

The system may be configured to take into account a value of an allowable bend radius of the cable when bending of the cable is required to follow the cable route. Thus the length of required cable may be different from that in the case that the cable was considered to be capable of bending abruptly through an angle of substantially 90°.

The controller may be operable to determine a relative position and orientation of the vehicle with respect to the charging station in dependence on position data received by the controller.

Optionally the position data corresponds to a bearing of the charging station from the vehicle or a bearing of the vehicle from the charging station at at least two respective different bearings; vehicle speed; vehicle trajectory; and whether the vehicle is moving in a forward or reverse direction.

Thus in some embodiments the controller may be operable to receive data corresponding to bearing and not to distance of the vehicle from the charging station. The controller may be configured to calculate the distance of the vehicle from the charging station by tracking movement of the vehicle over ground as a function of time and determining the bearing of the vehicle from the charging station at a plurality of different respective bearings of the vehicle. It is to be understood that relatively straightforward trigonometric calculations may be made in order to determine the relative position and orientation of the vehicle with respect to the charging station based on this information.

The position data may correspond to a bearing of the charging station from the vehicle or a bearing of the vehicle from the charging station at at least two respective different times; vehicle speed; vehicle trajectory; and whether the vehicle is moving in a forward or reverse direction.

The system may be operable to determine substantially continuously whether the cable is sufficiently long when it is determined that a charging station is within a first range of the vehicle.

The first range may be defined as any range at which the system is able to determine the bearing of the charging station from the vehicle or the bearing of the vehicle from the charging station.

The system may be operable to determine the relative position and orientation of the vehicle with respect to the charging station by reference to at least one selected from amongst data in respect of a current location of the vehicle and a location of a charging station; a wireless signal received from the charging station; an image of an environment external to the vehicle; and data corresponding to the distance of one or more objects from the vehicle that have been detected by an object distance measuring module, the object distance measuring module being a module operable to detect radiation emitted by the module and reflected back to the module by an object thereby to measure object distance.

The object distance measuring module may for example comprise a radar or ultrasonic radiation transmitter/detector module. The module may be provided by a parking sensor.

It is to be understood that in some embodiments the system may determine whether the vehicle is within a prescribed range of the charging station by reference to location information derived from a global positioning satellite (GPS) system, a general packet radio service (GPRS) system or any other suitable location determining system. Alternatively or in addition the system may be arranged to receive a signal transmitted by the charging station and received by a receiver of the vehicle in order to determine whether the vehicle is within a prescribed range. The signal may be a short range radio signal such as a Bluetooth® signal, a wi-fi signal or any other suitable signal.

In some still further embodiments, in addition or instead the system may be operable to determine whether the vehicle is within a prescribed range by reference to an image captured by a camera fitted to the vehicle. The system may be arranged to identify the charging station or an object or image such as an icon associated with the charging station that is detected in the captured image. In some embodiments, in addition or instead the system may be arranged to employ an object distance measuring module as noted above such as a parking sensor module or the like. The module may for example employ a radar signal or ultrasonic radiation to detect the distance of the vehicle from a charging station or object associated with the charging station.

The system may be arranged to correlate data in respect of relative positions of the charging station and vehicle obtained by two or more different methods such as two or more of the above described methods in order to increase confidence in the determination whether the vehicle is within the prescribed range of the charging station.

The system may be operable to provide an indication to the user as to whether an amount of cable required to establish a charging connection between the vehicle and the charging station is increasing or decreasing.

This feature has the advantage that a user can adjust a position, a trajectory and/or a speed of the vehicle as the user maneuvers the vehicle thereby to conveniently position the vehicle sufficiently close to the charging station to enable a charging connection to be established. It is to be understood that this may reduce a risk of 'sail past' in which a user drives the vehicle sufficiently close to the charging station to enable a charging connection to be established, but then moves out of range of a charging connection.

The system may be operable to receive data corresponding to the relative position and orientation of the vehicle with respect to the charging station from an external source.

The system may comprise one or more sensors or one or more detectors for generating the data corresponding to the relative position and orientation of the vehicle with respect to the charging station.

The controller may be provided with data indicative of the first length.

In a further aspect of the invention for which protection is sought there is provided a motor vehicle comprising a system according to a preceding aspect.

In one aspect of the invention for which protection is sought there is provided a method comprising: determining by means of a controller whether a prescribed length of cable is sufficiently long to allow a charging connection to be established between a motor vehicle and a charging station in dependence on data corresponding to a relative position and orientation of the vehicle with respect to the charging station; and providing an output to a user indicating whether the cable is sufficiently long.

The method may comprise generating data corresponding to the relative position and orientation of the vehicle with respect to the charging station from one or more sensors or one or more detectors.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described with reference to one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

Figure 1:
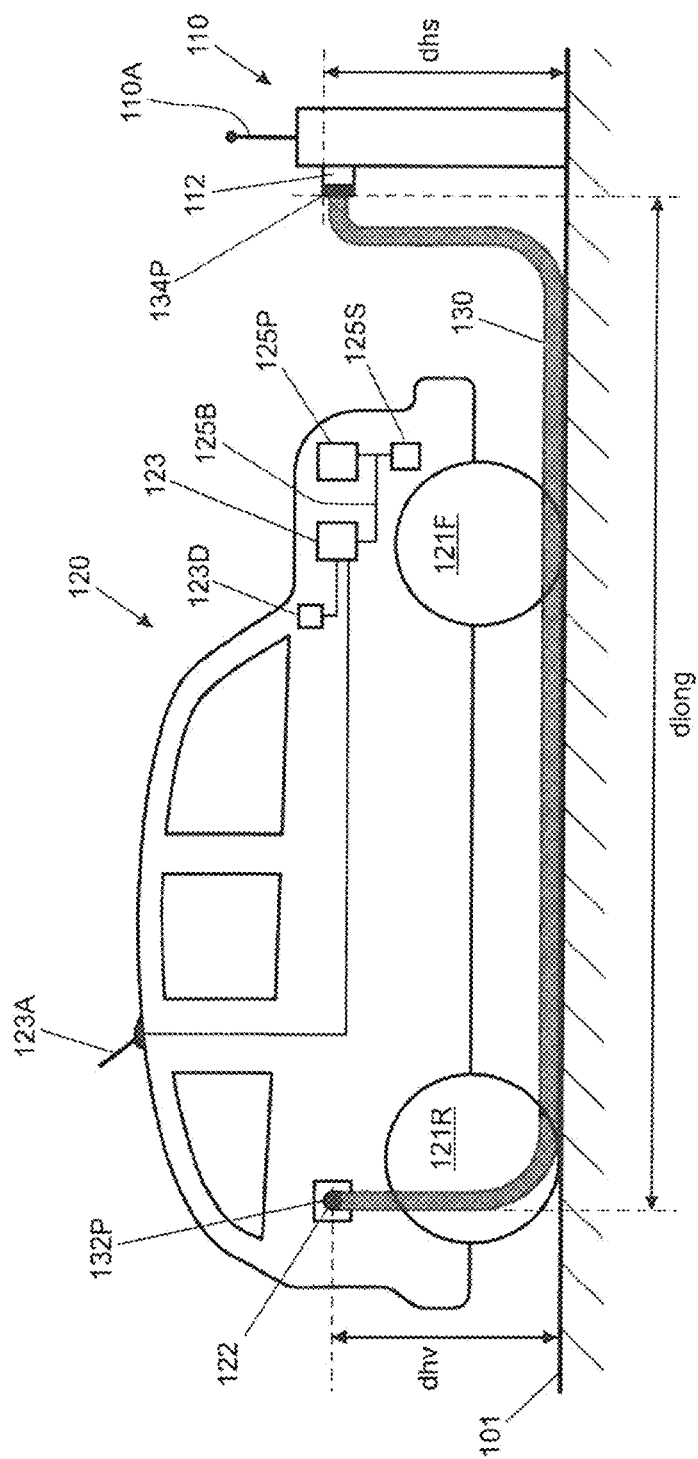
FIG. 1 is a schematic illustration of a vehicle according to an embodiment of the present invention coupled to a charging station in front of the vehicle by means of a charge cable as viewed from one side.

FIG. 1 shows a vehicle 120 according to an embodiment of the present invention. The vehicle 120 is shown parked adjacent to a charging station 110 located ahead of the vehicle 120. The vehicle 120 has two rear wheels 121R and two steerable front wheels 121F.

In the embodiment of FIG. 1, the vehicle 120 has a charge socket 122 located on a right-hand side of the vehicle 120 above the rear right-hand wheel 121R. The charge socket 122 is shown connected to a plug 132P that is attached to one end of a charging cable 130.

The vehicle 120 has a guidance system controller 123, which may be in the form of a computing means or computing device, operable to provide an indication to a user of the vehicle 120 whether or not the vehicle 120 is at a location sufficiently close to the charging station 110 to allow the charging cable 130 to establish a charging connection between the vehicle 120 and the charging station 110.

The controller 123 is arranged to receive a radio signal from an antenna module 123A mounted to a roof of the vehicle 120. The controller 123 is configured to determine a bearing of the vehicle 120 from the charging station 110 based on the signal received from the antenna module 123A. It is to be understood that a number of different known radio navigation technologies may be employed in order to determine the bearing of the vehicle 120 from the charging station 110. In the present embodiment, by the term bearing is meant an angle between a longitudinal axis L of the vehicle 120 (FIG. 2) and an imaginary line from the vehicle 120 to the charging station 110.

The controller 123 is also arranged to receive data corresponding to vehicle speed, vehicle trajectory and whether the vehicle 120 is moving in a forward or reverse direction. This data is read by the controller 123 from a controller area network (CAN) bus 125B. The CAN bus 125B allows controllers connected thereto to share data with one another. In the present case, guidance system controller 123 receives data corresponding to vehicle speed and selected gear that is published on the CAN bus 125B by a powertrain controller 125P. From the selected gear the controller 123 may determine whether the vehicle 120 is moving in a forward or reverse direction. The controller 123 also receives data indicating a steerable road wheel angle published on the CAN bus 125B by a steering controller 125S.

Figure 2:
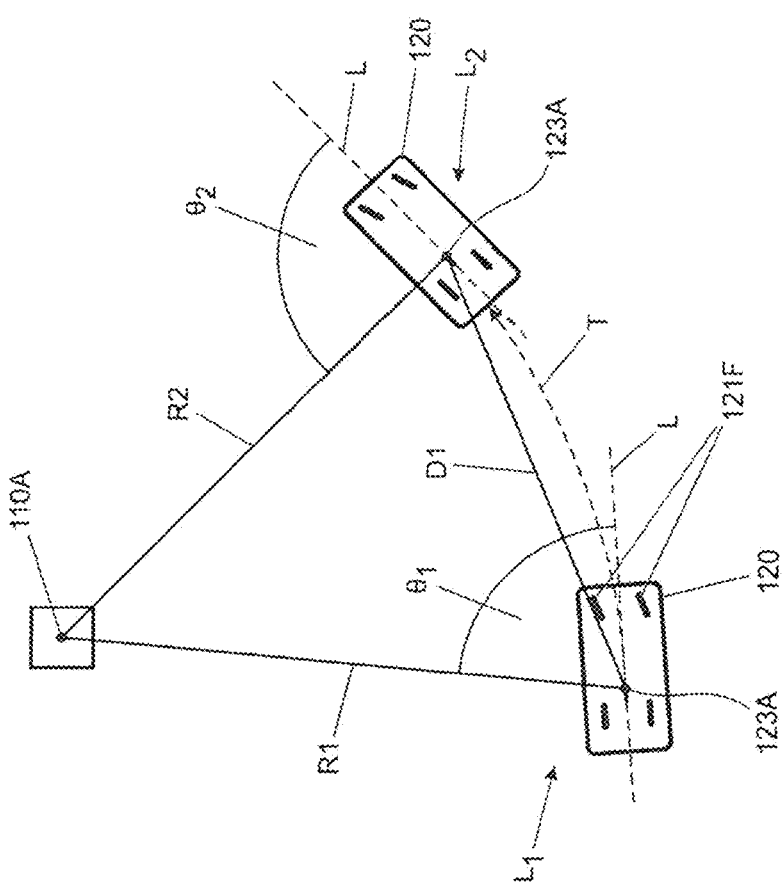
FIG. 2 is a schematic plan view of the vehicle of FIG. 1 at two different locations with respect to a charging station.

FIG. 2 illustrates the method by which the guidance system controller 123 determines the relative location of the vehicle 120 and charging station 110. As the vehicle 120 travels to the charging station 110, at location L1 the vehicle antenna module 123A receives the radio signal transmitted by the charging station antenna 110A and determines the value of angle θ1 between the vehicle longitudinal axis L and an imaginary line from the vehicle 120 to the charging station 110 of length R1. The guidance controller 123 monitors vehicle speed, trajectory and whether the vehicle 120 is moving in a forward or reverse direction. At location L2 the guidance controller 123 again determines the value of angle θ2 between the vehicle's longitudinal axis L and the imaginary line to the charging station 110, this time of length R2. Based on the measured values of θ1 and θ2, a knowledge of the path of the vehicle 120 over ground between locations L1 and L2, the guidance controller 123 is able to determine the relative position and orientation of the vehicle 120 with respect to the charging station 110. In the embodiment of FIG. 1 the controller 123 determines a straight-line distance D1 between locations L1 and L2 based on vehicle speed and vehicle trajectory over the period of travel from location L1 to location L2. The controller 123 then calculates the distance R2 between the vehicle 120 and charging station 110 at location L2 from the values of θ1, θ2 and D1. The orientation of the vehicle 120 at location L2 is determined by reference to the value of θ2.

In the present embodiment the controller 123 also receives data indicating an angle of the longitudinal axis L of the vehicle 120 with respect to magnetic north. From this data and a knowledge of the position of the charging station charge socket 112 with respect to the charging station, the controller 120 is able to determine more accurately the required length of cable 130 to enable a charging connection to be established.

For example, the controller 123 may be provided with data corresponding to a direction along which a charge cable 130 is required to connect to the charging station charge socket 112 with respect to magnetic north or any other suitable reference such as true north. The controller 123 may be configured to take this into account when determining a required length of cable 130 to establish a charging connection.

In some embodiments the controller 123 may be configured repeatedly to determine the distance R of the vehicle 120 from the charging station 110 and the orientation θ of the vehicle 120 with respect to the charging station 110 whenever the controller 123 is able to receive a signal transmitted by a charging station 110.

In an alternative embodiment, the guidance system controller 123 is able to determine the distance of the vehicle 120 from the charging station 110 as well as the bearing of the charging station 110 from the vehicle 120 (or vice-versa) from a radio signal received from the charging station at a single location of the vehicle 120.

In the present embodiment, the charging station 110 is configured to transmit a short range radio signal from the antenna 110A which is detected by vehicle antenna module 123A. As well as allowing the guidance system controller 123 to determine bearing data, the station 110 also encodes with the signal an identifier corresponding to the identity of the charging station 110. The identifier may include location information such as geographical coordinates of the charging station 110 (for example latitude and longitude data). In some embodiments the guidance system controller 123 is operable to determine whether charging at the charging station 110 is permitted, for example responsive to data transmitted by the charging station indicating whether charging is permitted or by reference to a database of charging stations at which charging is permitted. Other arrangements are also useful.

In the event that a signal is received from a plurality of stations 110, the controller 123 may be operable to select a predetermined one of the charging stations according to the identifier transmitted by the charging station 110. For example in some embodiments the controller 123 may select the charging station corresponding to the user's residence, place of work, or the like. In some embodiments the controller 123 may be operable to select the nearest charging station 110 to the vehicle 120 at a given moment in time.

In some embodiments the controller 123 may receive data corresponding to the cost of charging the vehicle 120 by means of the charging station 110. For example the data may indicate the cost levied by an operator of the charging station 110, for example the cost per unit of charge plus any parking or other charges associated with use of the charging station 110. The guidance system controller 123 may be configured to provide a corresponding indication to the user by means of a vehicle HMI (human machine interface) display 123D. The controller 123 may be configured in some embodiments to determine how much charge the vehicle requires to receive (or download) based on the battery state of charge (SoC) and provide an indication to the user as to the expected cost based on cost data transmitted by the charging station 110.

When the guidance system controller 123 detects the presence of a charging station 110 based on a signal received by the antenna module 123A, the controller 123 is arranged to provide an indication to a user of the vehicle 120 that a charging station 110 has been detected. The controller 123 may in some embodiments be operable to provide an indication to the user of the location of the charging station 110. The controller 123 may be operable to provide route guidance information to direct the user to the charging station 110 if required.

Figure 3:
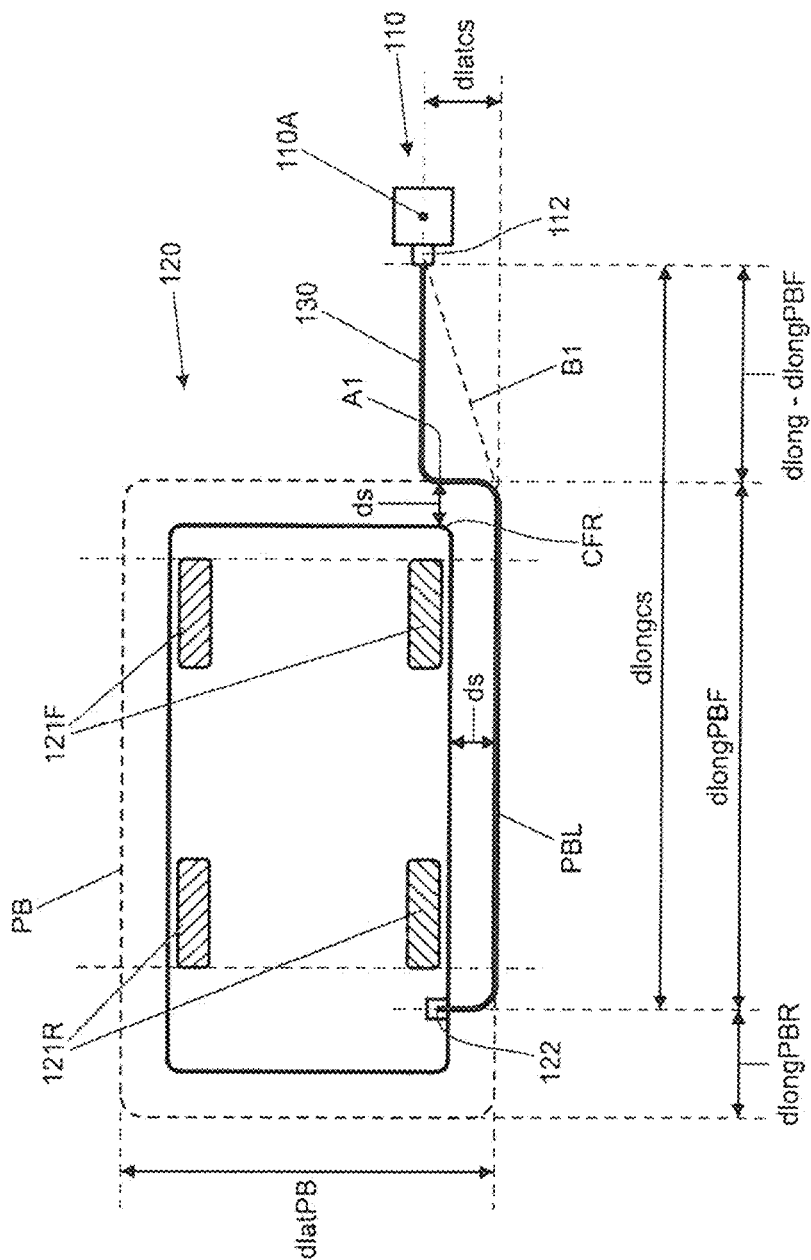
FIG. 3 is a schematic plan view of the vehicle of FIG. 1 in the position shown in FIG. 1.

FIG. 3 shows a plan view of the vehicle 120 in the location shown in FIG. 1. At this location and in the cable configuration shown in FIG. 1, the cable 130 has a fall from the vehicle charge socket 122 directly to ground 101 of length dhv. The cable 130 then runs along the ground 101 around a front corner CFR of the vehicle 120 and on to a location immediately below the charge socket 112 of the charging station 110. The cable 130 rises substantially vertically upwards to connect to the charging station charge socket 112 by means of a second plug 134P that is provided at a second free end of the cable 130. At the charging station 110, the cable 130 has a fall of length dhs from the charge socket 112 to ground 101. It can be seen from FIG. 1 that the charge socket 112 is located a distance dlongcs forward of the vehicle charge socket 122 with respect to longitudinal axis L of the vehicle.

In the present embodiment the controller 123 is configured to determine whether an available length of charge cable 130 is sufficiently long to reach from the vehicle charge socket 122 to the charging station charge socket 112. The controller 123 accomplishes this by determining a required length of the cable 130 between the charge sockets 112, 122 on the basis that the cable follows a shortest approved route between the sockets 112, 122.

In the present embodiment the controller 123 calculates the required length along a route that requires the cable to (1) fall substantially vertically directly from the vehicle charge socket 122 to ground; (2) travel along a peripheral boundary PB of the vehicle 120 (FIG. 3); (3) travel over ground substantially directly to the charging station 110 from the peripheral boundary in a direction substantially normal to the peripheral boundary PB; and (4) rise substantially vertically to the charging station charge socket 112. It is to be understood that other arrangements are also useful.

The peripheral boundary PB is defined by an imaginary line on the ground 101 that encircles the vehicle a distance ds outside a footprint area of the vehicle 120. In the present embodiment ds has a value of substantially 0.1 m although other distances (including zero distance) are also useful. The footprint area of the vehicle 120 is defined as the area over which a shadow would be cast on the ground 101 if the vehicle 120 were illuminated from above with substantially parallel, vertical rays of illumination, excluding areas corresponding to the location of any wing mirrors of the vehicle 120 and the like.

In the present embodiment the route along and/or around the peripheral boundary PB is selected so that a portion of the cable 130 that runs from the peripheral boundary PB to the charge socket 112 of the charging station 110 runs over a distance that is the shortest available distance. This is so as to reduce the amount of cable 130 not located at the peripheral boundary. The cable configuration of FIG. 1 and FIG. 3 illustrates this arrangement.

It can be seen from FIG. 3 that, due to a lateral offset of an amount dlatcs of the charging station charge socket 112 from a longitudinal portion PBL of the peripheral boundary PB running along the right-hand side of the vehicle 120, the cable 130 follows the peripheral boundary PB of the vehicle 120 from the vehicle charge socket 122 around the front right-hand corner CFR of the vehicle 120 to a location A1 in front of the vehicle 120 before running to the charging station 110 along a line substantially perpendicular to the peripheral boundary PB.

The controller 123 determines the length of the selected route and determines whether this is less than or substantially equal to the available length of charging cable 130, which is known to the controller 123. If the cable 130 is sufficiently long the controller 123 provides a corresponding indication to the user. In order to enable the controller 123 to determine the required length of cable 130, the controller 123 is provided with data corresponding to a distance dhv from the vehicle charging socket 122 substantially vertically downwards to ground 101; a distance dhs from the charging station socket 112 substantially vertically downwards to ground 101; a longitudinal distance dlongPBR from the vehicle charging socket 122 to a rearmost position of the peripheral boundary PB where the peripheral boundary PB runs laterally behind the vehicle 120 from one side of the vehicle 120 to the other, a longitudinal distance dlongPBF from the vehicle charging socket 122 to a forwardmost position of the peripheral boundary PB where the peripheral boundary PB runs laterally in front of the vehicle 120 from one side of the vehicle 120 to the other; and a lateral width of the peripheral boundary dlatPB from one longitudinal side PBL of the peripheral boundary PB to the other. In the embodiment discussed herein the vehicle 120 is assumed to have a substantially rectangular footprint area and therefore the peripheral boundary PB is assumed to have a correspondingly rectangular shape. Other shapes of peripheral boundary PB are useful in some embodiments.

In some embodiments, if the charge cable 130 is not sufficiently long to enable such a connection to be made, but would be sufficiently long if the cable 130 followed a longer route from the charging station charge socket 112 to the peripheral boundary PB, the latter route is selected by the controller 123. An example of such a route is illustrated by the dashed line B1 in FIG. 3. It can be seen that as the cable 130 bends around the front right-hand corner CFR of the vehicle 120 along the peripheral boundary PB, instead of following the peripheral boundary PB to location A1 the cable 130 is directed to run in a substantially straight line directly towards the charging station 110. The cable 130 therefore follows a route between the charging sockets 122, 112 requiring a shorter length of cable 130 to be used whilst not penetrating the peripheral boundary PB. It is to be understand that it is preferable to avoid penetrating the peripheral boundary in order to prevent snagging of the able 130, for example by becoming trapped under a wheel 121F, 121R of the vehicle 120.

In the present embodiment, an icon on a guidance system display 123D representing the charging station 110 illuminates in a green colour when the vehicle 120 is sufficiently close to the charging station 110 to enable a charging connection to be established with the available length of charging cable 130.

Furthermore, in the present embodiment if the amount of cable 130 required to establish a charging connection is 20% or more of the available cable length, the icon representing the charging station 110 illuminates in a red colour. If the amount of cable 130 required is more than the available length but less than 20% in excess of the available length, the icon representing the charging station 110 illuminates in orange. This enables the user to gauge the distance of the vehicle 120 from a location at which the charging cable 130 is sufficiently long to enable a connection to be made.

Other arrangements are also useful. For example, other proportions of the available length of cable 130 may be employed to determine icon colour instead of 20%. In some embodiments an absolute length of cable 130 in excess of the available length may be employed to determine icon colour.

Other forms of indication may be provided in addition or instead, such as a different visual icon, an audible alert or any other suitable indication. In some embodiments the controller 123 provides an indication of the actual amount (in units of length, for example meters or feet) of the amount of additional cable that would be required in order to establish a charging connection from the vehicle's current location. This information may assist the user in positioning the vehicle 120 at a location at which a charging connection may be made.

In some embodiments the controller 123 is configured to take into account the presence of one or more obstacles between the vehicle 120 and charging station 110 in determining the length of cable 130 required to establish a charging connection. Data in respect of the presence of one or more obstacles may be stored in a memory of the vehicle 120 that is accessible by the controller 123, and/or transmitted to the controller 123 by a second computing means or device associated with the charging station 110. The data may be transmitted to the vehicle 120 by means of the charging station antenna 110A, optionally employing the same radio signal as that used by the controller 123 to determine the bearing of the vehicle 120 from the charging station 110.

In the embodiment of FIG. 1 the controller 123 is configured to determine the length of cable 130 required to connect the vehicle 120 to the charging station 110 with any required bends of the cable 130 being of a predetermined radius. The predetermined radius may correspond to a smallest radius to which the cable 130 may be repeatedly bent without significant damage to the cable 130.

It is to be understood that the vehicle antenna module 123A may comprise a plurality of antenna elements in order to enable the bearing of the charging station 110 to be determined. In some embodiments the vehicle 120 may be provided with a plurality of antenna modules 123A in order to determine charge station bearing.

It is to be understood that in the configuration shown in FIG. 1 and FIG. 3 the controller 123 may be arranged to calculate the required length of cable 130 to establish a charging connection by summing the values of dhv, dlongcs, dlongPBF, dlatcs, (dlongcs−dlongPBF) and dhs, to obtain a value dtotal. Other summing operations may also be useful. The controller 123 may adjust the value of dtotal to account for the fact that the cable 130 does not bend abruptly when required to bend, but bends with a curvature having a predetermined minimum radius. The controller 123 may therefore take into account the number of required bends and the angle through which the cable is bent at each bend.

The value of dhv and dhs may be adjusted to compensate for bending of the cable 130 in the vicinity of plugs 132P, 134P if bending is required.

The controller 123 may be configured to calculate a shortest path of the cable 130 that is required in order to establish a charging connection given any further constraints that may be imposed. For example, in some situations it may be desirable for a charging cable 130 to travel along a peripheral boundary PB of the vehicle 120 in one direction in preference to another in some circumstances.

Figure 4:
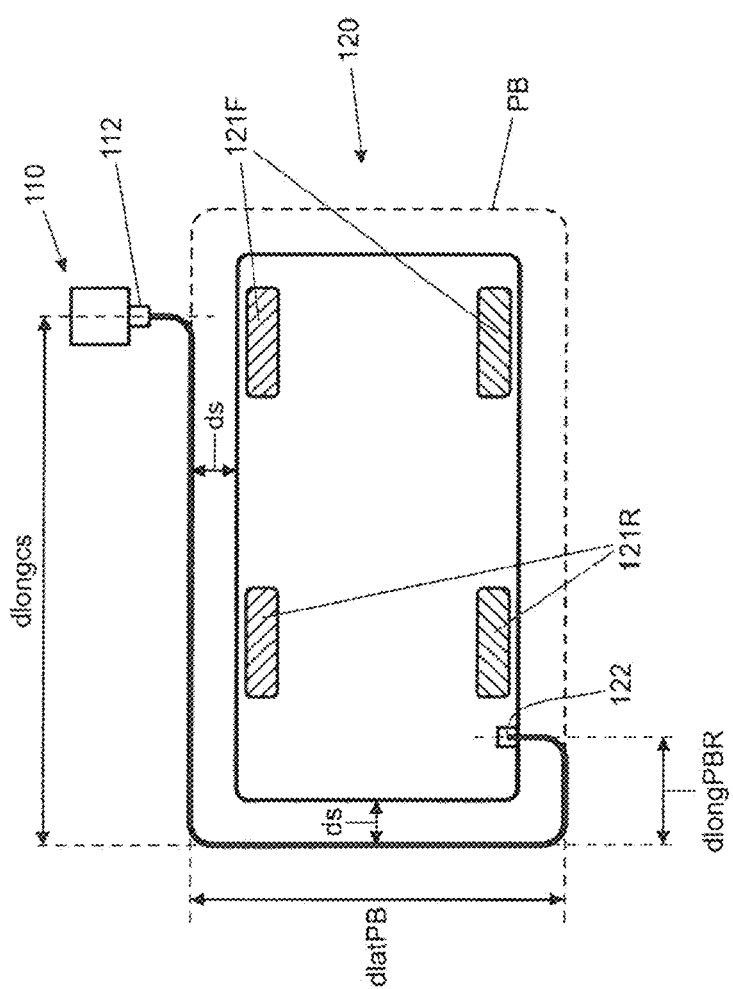
FIG. 4 is a schematic plan view of the vehicle of FIG. 1 shown coupled to a charging station at the side of the vehicle by a front left-hand wheel, the cable passing around a front of the vehicle outside a footprint along a peripheral boundary of the vehicle.

FIG. 4 shows a scenario in which the vehicle 120 is parked with the charging station 130 located opposite a front left-hand wheel 121F. The controller 123 has determined the location of the vehicle 120 with respect to the charging station 110 and that two possible routes exist for the cable 130 to run from the vehicle charge socket 122 to the charging station charge socket 112.

In the scenario of FIG. the cable 130 follows a route in which the cable 130 runs rearwardly from the vehicle charge socket 122 along the peripheral boundary PB to the charging station charge socket 110. As can be seen from FIG. 4 in conjunction with FIG. 1 the required cable length is calculated based on a knowledge of distance dhv, dlongPBR, dlatPB, dlongcs and dhs.

Figure 5:
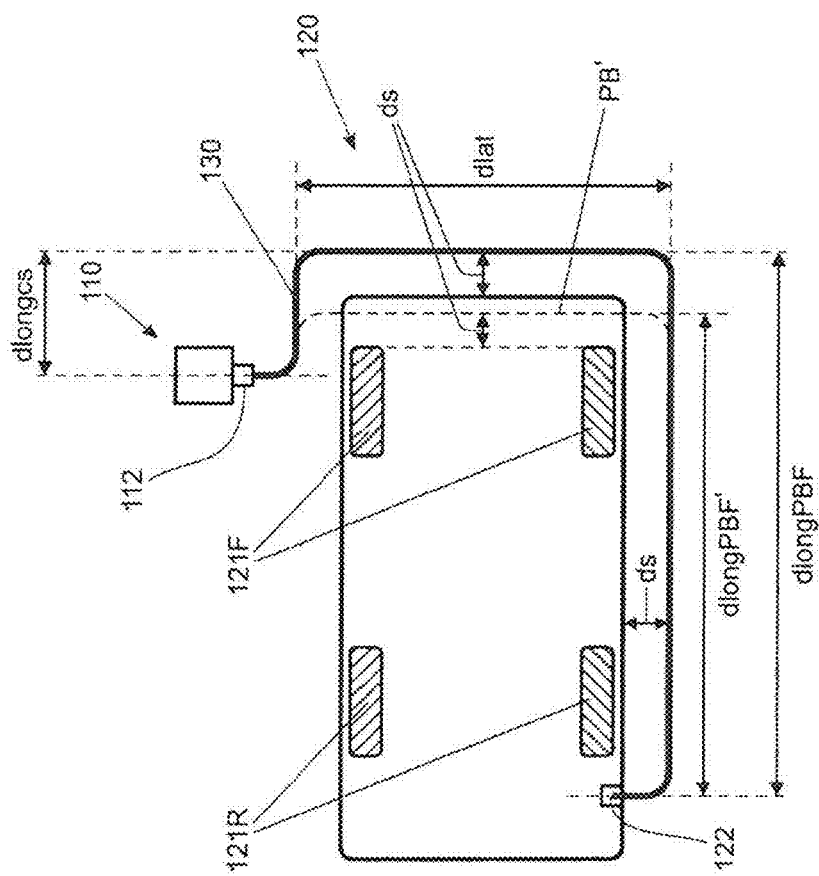
FIG. 5 is a schematic plan view of the vehicle of FIG. 1 at the location shown in FIG. 4, the vehicle being coupled to a charging station at the side of the vehicle by a front left-hand wheel, the cable passing around a front of the vehicle along the peripheral boundary of the vehicle.

FIG. 5 shows an alternative route in which the cable 130 runs forward from the vehicle charge socket 122 along the peripheral boundary PB to the charging station charge socket 112. The guidance system controller 123 is configured to determine the length of cable 130 required in order to establish a charging connection via this route. The controller 123 calculates the required length of cable 130 based on a knowledge of distance dhv, dlongPBF, dlatPB, dlongcs and dhs. The distance dlongcs corresponds to the longitudinal distance from the forward limit of the peripheral boundary PB to the location along the longitudinal portion of the peripheral boundary PB at which the charging cable 130 rises to the charging station charge socket 112.

The controller 123 determines whether the route requiring the shortest length of cable 130 is sufficiently short to enable a charging connection to be established using the available length of cable 130. Having made this determination the controller 123 sets the colour of the icon representing the charging station to either green, orange or red as discussed above.

In some embodiments, the controller 123 may be operable to calculate the required length of cable 130 for a route that allows the cable 130 to pass underneath a portion of the vehicle 120. In some embodiments in which this is permitted, the controller 123 may be operable to calculate the required length of cable 130 for a route in which the cable 130 follows an alternative peripheral boundary PB' which passes laterally across the vehicle at a distance ds forward of a forwardmost portion of a front wheel 121F of the vehicle and/or a distance ds rearward of a rearmost portion of a rear wheel 121R. The alternative peripheral boundary PB' may be arranged to follow a similar path to peripheral boundary PB except where the cable crosses a width of the vehicle 120. The value of ds may be any suitable value as noted above, for example of around 0.1 m. A dimension dlongPBF' associated with the alternative peripheral boundary corresponding to dimension dlongPBF may therefore be employed to determine a required length of cable, in addition to a reduced value of dlongcs in the scenario of FIG. 5.

In some embodiments the controller 123 may be operable to determine a required cable length on the basis that the cable 130 is permitted to pass underneath the vehicle 120 at a location between forwardmost and rearmost wheels 121F, 121R of the vehicle 120.

Embodiments of the present invention have the advantage that a user of a vehicle 120 can know whether or not the vehicle 120 is currently positioned sufficiently close to a charging station 110 to enable a charging connection to be established between the vehicle 120 and charging station 110 using an available charging cable 130. The guidance system controller 123 is provided with data representing certain dimensions associated with the vehicle 120 as well as the length of charging cable 130 available to the user. Based on this information and a knowledge of the position of the charging station 110 relative to the vehicle 120 the controller 123 is able to determine whether the cable 130 is sufficiently long.

It is to be understood that in some embodiments in addition to or instead of employing a radio signal to determine the location of the vehicle 120 with respect to the charging station 110, the controller 123 may be operable to employ data obtained by reference to one or more images captured by one or more cameras of the vehicle 120 that is/are configured to capture images of an environment external to the vehicle 120. For example one or more cameras may be positioned to capture an image of an environment ahead of the vehicle, behind the vehicle, to a side of the vehicle and/or any other suitable area external to the vehicle 120. In some embodiments the controller 123 may be operable to recognise the presence of a charging station 110 by reference to one or more characteristics of the charging station 110. In some embodiments an identifier may be attached to a charging station 110 that may be recognised in a captured image by the controller 123, for example a QR code or other symbol or icon. One or more other sensors that may be associated with the vehicle 120 may be employed where available, such as one or more parking sensors.

Embodiments of the invention have the advantage that a driver may be provided with an indication as to whether the vehicle 120 is sufficiently close to a charging station 110 to enable a charging connection to be made. This prevents a situation occurring in which the user exits the vehicle 120 only to find the vehicle 120 is not parked sufficiently close to a charging station 110 to enable a charging connection to be established.

In some embodiments the controller 123 may be operable to provide guidance information to the user, for example an indication as to a required or an advisable orientation of the vehicle 120 with respect to a charging station 110 to enable a charging connection to be established. In some embodiments the controller 123 may provide an indication to a user whether an allowable route exists enabling connection of the vehicle 120 to the charging station 110, allowability being determined with respect to one or more rules in addition to the requirement that the route length does not exceed that of the available cable 130. A rule may prescribe for example that at a particular charge station location a cable 130 must follow a shortest route to a side of the vehicle 120 on which the charging station 110 is located, or that a cable 130 may not pass in front of and/or behind the vehicle 120. Other rules may also be imposed in addition or instead. Rules may be prescribed for example by legislation, by a charge station operator, a vehicle operator or any other body.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system in a motor vehicle, the system comprising:
a controller operable to receive data indicative of a relative position or orientation of the vehicle with respect to a vehicle charging station and to determine in dependence on the received data whether a length of a cable is sufficiently long to allow a charging connection to be established between the vehicle and the charging station via the cable; and wherein the controller is operable to provide output to a user indicating whether the length of the cable is sufficient to establish the charging connection.

2. The system of claim 1, wherein the controller is operable to determine a length of a cable route allowing a charging connection to be established that includes one or more predetermined route portions.

3. The system of claim 1, wherein the controller is operable to determine a length of a cable route allowing a charging connection to be established that excludes one or more predetermined cable route portions.

4. The system of claim 1, wherein the controller is operable to determine a length of a cable route such that the cable route is external to a predetermined peripheral boundary of the vehicle.

5. The system of claim 4, wherein the controller is configured such that the predetermined peripheral boundary encircles a wheelbase of the vehicle, optionally a footprint of the vehicle.

6. The system of claim 1, wherein the controller is operable to determine a shortest cable route between the vehicle and the charging station.

7. The system of claim 1, wherein the controller is operable to determine the relative position and orientation of the vehicle with respect to the charging station in dependence on position data received by the controller.

8. The system of claim 7, wherein the position data corresponds to a bearing of the charging station from the vehicle or a bearing of the vehicle from the charging station at at least two respective different bearings; vehicle speed; vehicle trajectory; and
whether the vehicle is moving in a forward or reverse direction.

9. The system of claim 1, wherein the controller is operable to determine substantially continuously whether the cable is sufficiently long when it is determined that the charging station is within a first range of the vehicle.

10. The system of claim 1, wherein the controller is operable to determine the relative position and orientation of the vehicle with respect to the charging station by reference to at least one of the following:
data in respect of a current location of the vehicle and a location of a charging station;
a wireless signal received from the charging station;
an image of an environment external to the vehicle; and
data corresponding to a distance of one or more objects from the vehicle that have been detected by an object distance measuring module, the object distance measuring module being a module operable to detect radiation emitted by the module and reflected back to the module by an object thereby to measure object distance.

11. The system of claim 1, wherein the controller is operable to provide an indication to the user as to whether a length of cable required to establish a charging connection between the vehicle and the charging station is increasing or decreasing.

12. The system of claim 1, wherein the controller is operable to receive data indicative of the relative position and orientation of the vehicle with respect to the charging station from an external source.

13. The system of claim 1, further comprising one or more sensors or one or more detectors for generating the data indicative of the relative position and orientation of the vehicle with respect to the charging station.

14. The system of claim 1, wherein the controller is provided with data indicative of the length.

15. The system of claim 1, wherein the controller is provided with data representing one or more dimensions associated with the motor vehicle, and wherein the controller is operable to determine in dependence on the provided data whether the length of cable is sufficiently long.

* * * * *